United States Patent [19]

Black

[11] 4,353,348
[45] Oct. 12, 1982

[54] ENERGY CONVERSION SYSTEM

[76] Inventor: Robert B. Black, Corpus Christi, Tex.

[21] Appl. No.: 105,277

[22] Filed: Dec. 19, 1979

Related U.S. Application Data

[60] Division of Ser. No. 813,667, Jul. 7, 1977, Pat. No. 4,197,831, which is a continuation of Ser. No. 620,327, Oct. 7, 1975, abandoned, which is a continuation-in-part of Ser. No. 462,094, Apr. 18, 1974, Pat. No. 4,025,291, which is a division of Ser. No. 192,262, Oct. 26, 1971, Pat. No. 3,844,270, said Ser. No. 620,327, is a continuation-in-part of Ser. No. 568,700, Apr. 16, 1975, abandoned, which is a continuation of Ser. No. 369,084, Jun. 11, 1973, abandoned.

[51] Int. Cl.$^3$ .............................................. F24C 3/00
[52] U.S. Cl. .................. 126/91 R; 237/12.1; 126/39 J
[58] Field of Search ............... 126/233, 39 J, 91 R, 126/91 A; 237/12.1; 123/198 C, 198 F; 60/396; 48/180

[56] References Cited

U.S. PATENT DOCUMENTS

| | | | |
|---|---|---|---|
| 1,621,179 | 3/1927 | Surlemont | 123/198 C |
| 1,761,849 | 6/1930 | Smith | 237/12.1 |
| 1,803,139 | 4/1931 | Smith . | |
| 2,567,143 | 9/1951 | Bodensieck | 237/12.1 |
| 3,374,780 | 3/1968 | Shimazaki | 123/198 C |
| 3,844,270 | 10/1974 | Black | 126/91 A X |

FOREIGN PATENT DOCUMENTS 660687 7/1929 France .................. 237/12.1

Primary Examiner—Samuel Scott
Assistant Examiner—Randall L. Green
Attorney, Agent, or Firm—Kenneth P. Synnestvedt

[57] ABSTRACT

A system for the transmission and conversion of the potential energy of hydrocarbon fuels to available heat, power and light. The system is particularly adapted for use with natural gas, artificial gases or any of the LPG fuels such as propane, butane, etc. According to the system of the invention, the fuel gas is mixed with air preferably in the amount providing the stoichiometric ratio to oxygen and is stored under pressure and ultimately transmitted to burner elements which are hermetically sealed except for the inlet and discharge ports, such as tubes, power sources, such as captive and free piston devices and gas turbines and light sources. The system includes special forms of equipment for mixing and pressurizing the gas and air in the correct ratio and special forms of equipment for establishing and controlling the combustion processes.

1 Claim, 16 Drawing Figures

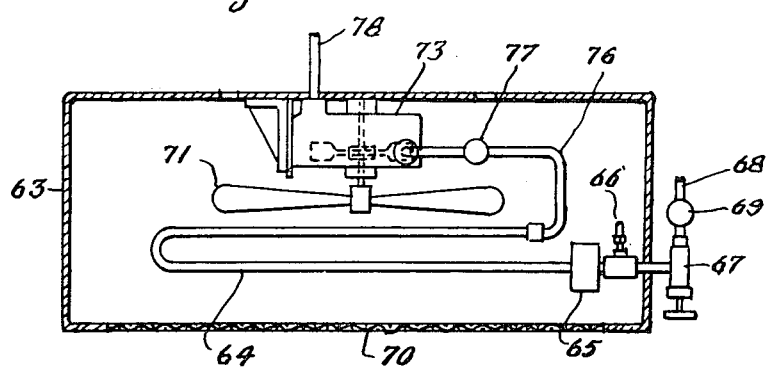
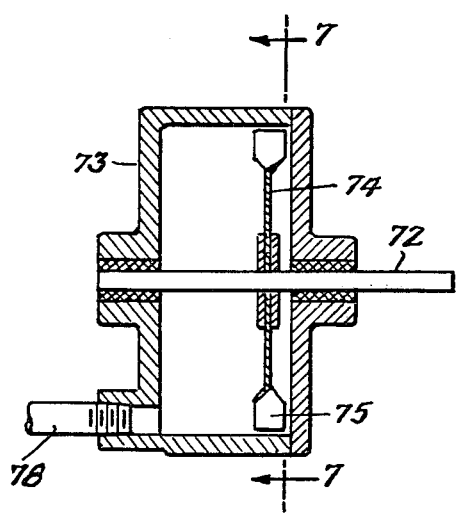
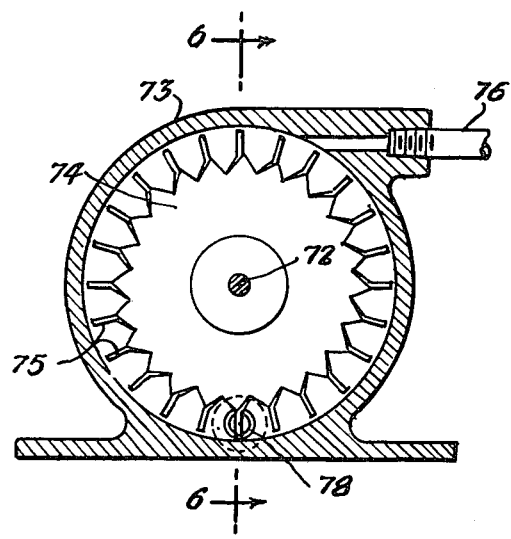
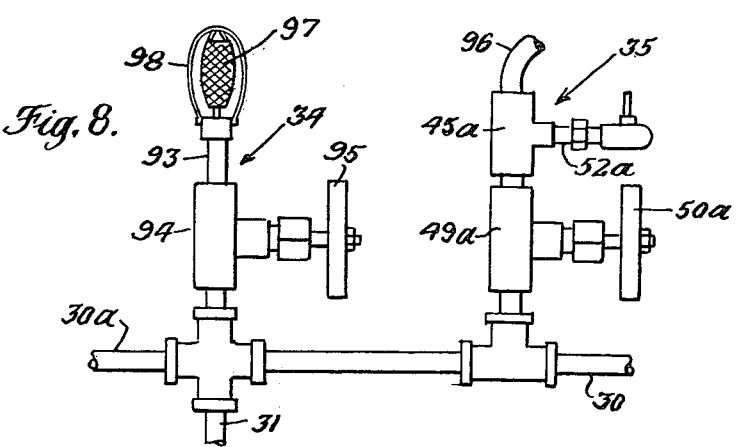

ENERGY CONVERSION SYSTEM

This application is a division of application Ser. No. 813,667, filed July 7, 1977, now U.S. Pat. No. 4,197,831 which, in turn, is a continuation of application Ser. No. 620,327, filed Oct. 7, 1975, now abandoned, which, in its turn, is a continuation-in-part of application Ser. No. 462,094, filed Apr. 18, 1974, issued May 24, 1977, as U.S. Pat. No. 4,025,291, which, in turn, is a division of application Ser. No. 192,262, filed Oct. 26, 1971, issued Oct. 29, 1974, as U.S. Pat. No. 3,844,270; and said prior application Ser. No. 620,327 is also a continuation-in-part of application Ser. No. 568,700, filed Apr. 16, 1975, now abandoned, which, in turn, is a continuation of application Ser. No. 369,084, filed June 11, 1973, now abandoned.

BACKGROUND

Although certain features of the system of the present invention are applicable for a wide variety of purposes, including power production and lighting, most aspects of the invention are of especial utility in the production of heat, the burner element in which the fuel is burned being adapted for heat transfer to solid, liquid or gaseous materials. Because of the special adaptability of the system of the invention for heating purposes, most of the following description is related to that general use of the system.

Heating systems and elements of a wide variety of types are already known. For domestic and industrial heating purposes, most of the systems in wide usage either employ open flame gas burners or electrical resistance heating elements. For example, kitchen ranges are customarily provided either with a group of open flame gas burners, or with a group of flat coil electrical heating elements.

Open flame gas burners have certain advantages including the fact that the burner may readily be incrementally adjusted to the flame or heat desired, but open flame burners have serious disadvantages including the release of noxious fumes and the tendency to accumulate soot in surrounding areas. Open flame burners also present an explosion and fire hazard. In addition, they tend to produce excessive heat in the working area and result also in burning up of the oxygen in the working area. Still further the open flame burners are disadvantageous as they require either matches or a constantly burning pilot light for ignition. Moreover, in spite of the fact that the common gas supply systems operate at a pressure of only a minor fraction of 1 psi, any leak in the system is a potential explosion and fire hazard because the leakage gas may readily be ignited in the presence of the oxygen in the ambient air.

On the other hand the common electrical resistance heating elements are advantageous in that they eliminate some of the deficiencies just referred to of open flame gas burners. However, the electrical heating resistance elements are in general more expensive to operate than those operating with gas, this differential being very pronounced in certain areas of the United States and many other countries, notably those areas which are relatively accessible to sources of natural gas in which one cent will buy about four times as many Btu's with gas as with electricity.

Both electric and open flame gas burners also have the disadvantage that the heating rate with such burners is relatively low.

THE SYSTEM OF THE INVENTION AND OBJECTIVES THEREOF

Briefly described, the system of the present invention as applied for the purposes of heating, for instance in a kitchen range burner, preferably comprises a means for mixing fuel gas with air in the correct ratio and for building up a substantial pressure in the mixture, together with a storage means for a supply of the pressurized gas-air mixture. A burner is provided, for example in the form of a flat spiral coil of a tube one end of which receives the fuel-air mixture and the other end of which discharges the products of combustion. The system further includes numerous features relating to control or regulation of the burning or combustion action, all of which will be described fully hereinafter.

It is a major general objective of the invention to provide a heating system, for instance for a kitchen range, which system retains most of the economy of the prior known open flame gas burners and also offers the principal advantages of the prior known electrical resistance heating elements, while at the same time eliminating the disadvantages of both of those prior types of heating systems.

Thus, the present invention contemplates a heating system of much lower operating cost than with electric systems and in which much faster heating may be achieved than with either electric or open flame gas burners. The noxious fumes and soot which are characteristics of open flame burners are eliminated, and the combustion products are not pollutants. The burner element does not consume oxygen in the work area. Explosion hazard is eliminated. Open pilot lights and matches are not needed. The system of the present invention, however, retains the economy of gas use. In comparison with the open flame gas burners, the system of the present invention is characterized by a much higher heat transfer rate or thermal efficiency.

To illustrate the effectiveness and rapidity of heating, a comparative test was made in which a quart of room temperature water was heated to a full boil on a conventional open flame gas burner, a conventional electrical resistance element, and on a pancake coil tubular heating element conforming with the system of the present invention. The burners were all turned on until their maximum heat output was reached before the test was begun. In the case of the electrical heater the time required to reach a full boil was 11½ minutes. In the case of the open flame gas burner, the time was 10 minutes, and in the case of the tubular heating element described herein, the time was 4 minutes. The same kettle was used in each test so as to eliminate possible variables which might result from using different kettles.

Various other advantages and operational characteristics will be described hereinafter following the description of the system as illustrated in the accompanying drawings.

BRIEF DESCRIPTION OF DRAWINGS

In the drawings—

FIG. 5 is a somewhat diagrammatic horizontal sectional view through a space heater constructed for use in accordance with the system of the present invention;

FIG. 6 is an axial sectional view through a turbine adapted to be employed to drive a fan, for instance in a space heater such as illustrated in FIG. 5, FIG. 6 being taken as indicated by the section line 6—6 on FIG. 7;

FIG. 7 is a sectional view of the turbine of FIG. 6 taken as indicated by the line 7—7 on FIG. 6;

FIG. 8 is a fragmentary enlarged view illustrating certain portions of the equipment shown in FIG. 2, especially the gas-air ratio testing equipment preferably employed;

DETAILED DESCRIPTION OF THE EMBODIMENTS ILLUSTRATED

Although the system of the invention is adapted for use in a wide variety of situations or installations, including industrial plants, motels and residences, for purposes of illustration herein, the system is shown and described as employed in a residence or home.

Figure 1:
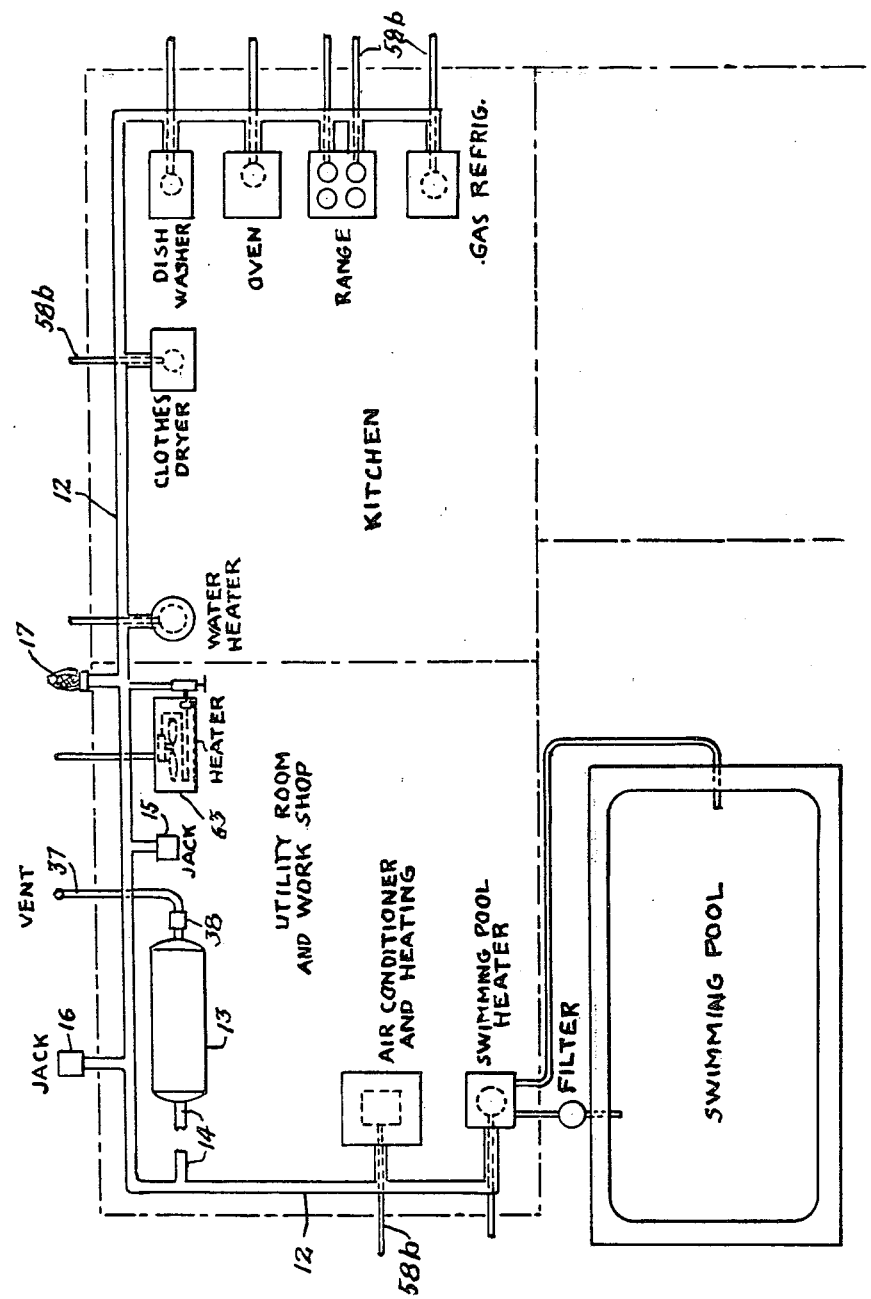
FIG. 1 is a schematic layout of some of the principal components of an energy conversion system according to the present invention as applied to various appliances commonly used in a home.

In FIG. 1 a portion of a home is indicated in plan by dot and dash lines, including a kitchen, a utility room and an adjoining outdoor swimming pool. Various appliances with which the system of the invention may be employed are shown in the kitchen, including a water heater, a clothes dryer, a dishwasher, a kitchen range and a kitchen oven, and a refrigerator of the type adapted for operation by gas heating. In the utility room there are also shown certain appliances adapted to be used with the system of the present invention, including a space heater, a unit adapted for alternative use for air conditioning and for heating, and a heater for water used in the swimming pool.

All of the appliances mentioned in both the kitchen and utility room are adapted to be fed with the pressurized gas-air mixture through the supply line indicated at 12. This supply line receives the pressurized gas-air mixture from a storage tank or reservoir 13 through the line indicated at 14. The storage tank 13 may be supplied with the desired pressurized gas mixture in the manner described below in connection with FIG. 2.

The system of the invention also desirably includes one or more jacks such as indicated at 15 and 16 providing for the "plug-in" of gas operated appliances, for example a gas operated torch or soldering iron or a device embodying a motor of some type operated by combustion of the gas. As will be seen from FIG. 1 one of these jacks (15) is located in the utility room where it may serve for attachment of devices to be used in a work shop, and the other jack (16) is located outside of the house to facilitate use of appliances in the surrounding area.

As shown in FIG. 1 the supply line 12 is also indicated as connected with a gas lamp, comprising a mantle 17 which may serve for outdoor lighting.

Figure 2:
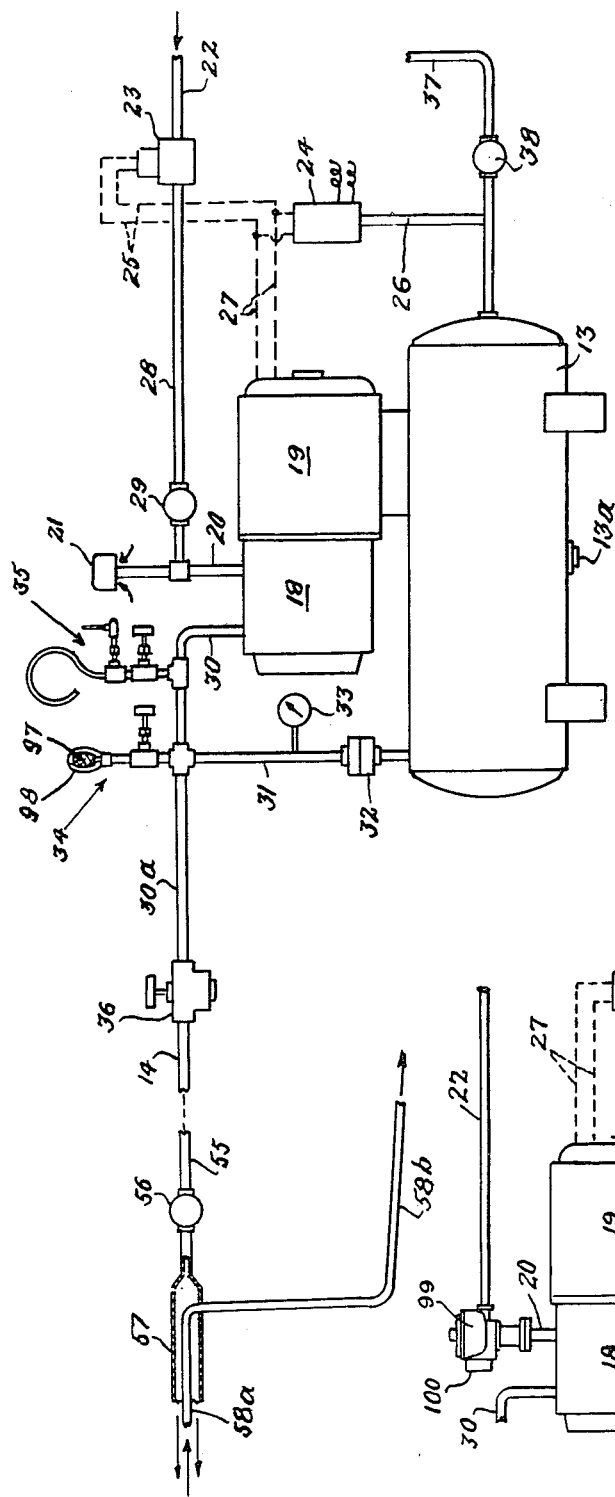
FIG. 2 is a schematic view of the major components of one form of gas and air mixing and storing equipment according to the invention, this system being applicable to an installation of the kind diagrammed in FIG. 1.

Turning now to the equipment shown in FIG. 2, it is to be understood that this represents one form of equipment which may be employed for charging the storage tank 13 with the pressurized gas-air mixture.

As shown in FIG. 2 a pressurizer or compressor 18 having a driving motor 19 is mounted upon the tank 13 the pressurizer having an intake line 20 with an air intake associated with the filter and silencer indicated at 21. The gas supply line is shown at 22, this line being provided with a master control valve 23 adapted to be operated by the pressure response of switch device 24 through the electrical circuit 25. The pipe 26 serves to communicate the pressure in the storage tank 13 to the pressure switch 24 and provide for the opening and closing of the valve 23 in accordance with the pressure in the supply tank. Typical pressure valves for opening and closing The switch will be referred to more fully hereafter. The switch 24 also has a circuit 27 for operating the motor 19 which drives the pressurizer 18.

When the valve 23 is open, gas will pass through the pipe 28 through the valve 29 and into the inlet line 20 extended to the pressurizer 18. The valve 29 desirably comprises a needle control valve for purposes to be explained more fully hereinafter.

The outlet from the pressurizer 18 is indicated at 30 and this line is extended for connection with pipe 31 which delivers into the storage tank 13. A flame arrestor 32 is introduced in the line 31 and this line 31 also desirably has a pressure gauge 33 for indicating the pressure in the supply tank. The flame arrestor 32 may be of any desired known type, including a simple pipe union or fitting stuffed with stainless steel wool.

For the purpose of testing and establishing the desired gas-air ratio, the system preferably includes two devices one of which is indicated generally at 34 and the other is indicated generally at 35, these devices being shown in greater detail in FIG. 8 and being described more fully hereinafter in connection with the description of the operation of the system.

The pipe 30 is not only connected with the storage tank 13 (through the pipe 31), but is also extended as indicated at 30a for delivery of the stored pressurized gas-air mixture to the various appliances or other points of use. As shown in FIG. 2, this supply line 30a desirably includes an adjustable pressure regulator 36, ensuring uniformity of pressure in the connection 14 (see also FIG. 1) on the downstream side of the regulator, i.e., in the supply line 12 and in various connections which would be extended from the supply line to the various appliances and devices to be operated. At the left end of FIG. 2 there is fragmentarily shown portions of one such appliance to which the pressurized mixture is being fed.

The supply tank is also desirably provided with a vent pipe 37 (see also FIG. 1) which is extended to a point exterior of the house and through which air may be discharged from the storage tank 13 when the tank is initially charged with the gas-air mixture, as will be further explained. The vent is provided with a shut off valve 38.

The storage tank 13 has a discharge valve device 13a in the bottom of a known type adapted to automatically discharge any condensate or accumulated liquid, without, however, discharging the stored pressurized gas-air mixture.

Figure 3:
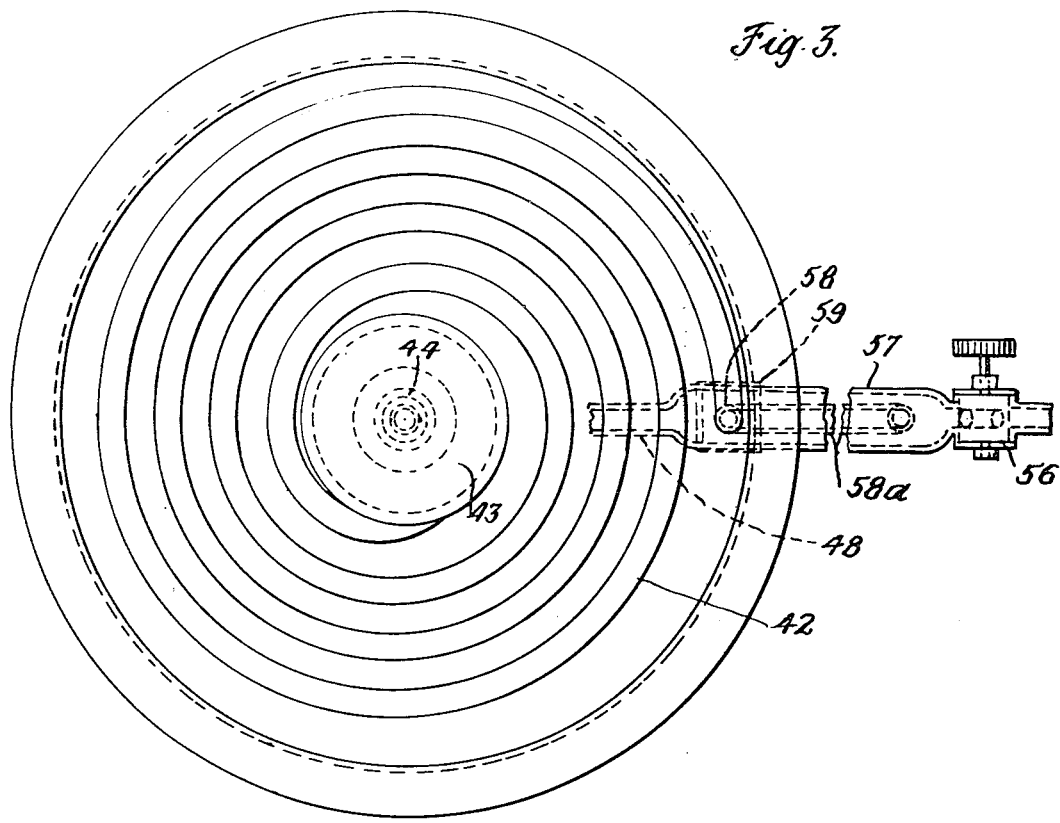
FIG. 3 is a plan view of a heating element and associated parts adapted for use as a heater on a kitchen range.
Figure 4:
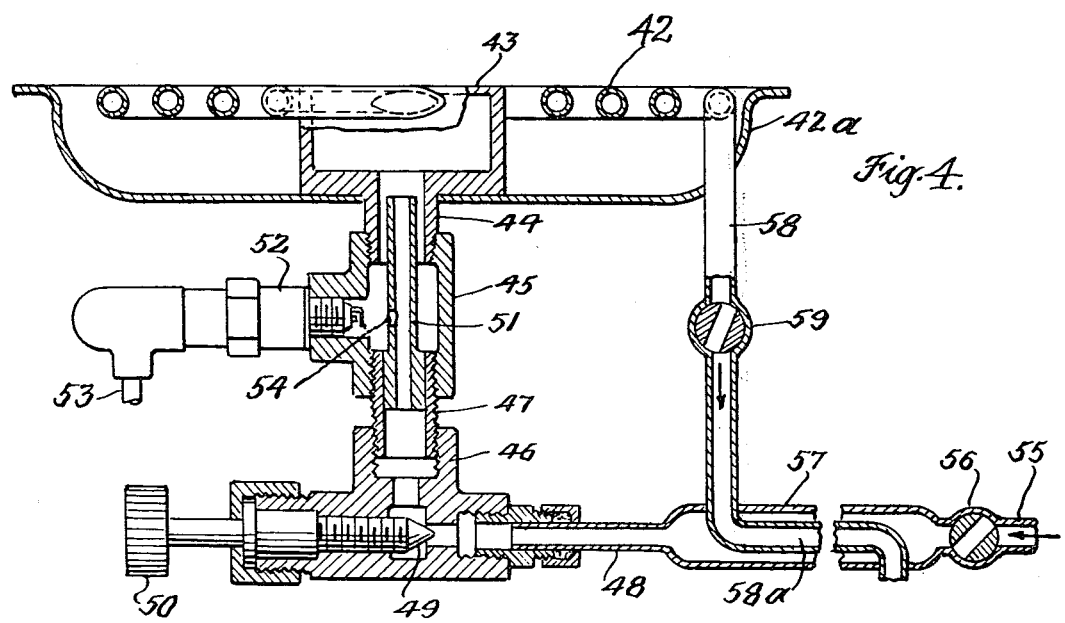
FIG. 4 is a sectional view of the heating element shown in FIG. 3 and associated inlet and discharge equipment.

Turning now to FIGS. 3 and 4, the burner element there shown comprises a tube 42, made for instance of a stainless steel or high nickel content metal, such as the metal known under the Trade Mark Incalloy, and identified as Incalloy 800. This tube is spirally wound in a flat coil and has its inner or inlet end connected with a small combustion chamber formed within the central fitting 43. A polished reflector 42a is desirably located below the tubular burner element 42 in order to reflect heat upwardly and to serve also as a drip pan.

The fitting 43 has a threaded nipple 44 cooperating with the T-fitting 45 which is connected in turn with the casing 46 of a valve structure by means of the threaded tube 47. The casing 46 is also connected to the supply line 48 and the communication from the supply line to the tube 47 and thus to the burner element is regulated or controlled by means of a needle valve 49 having an external operating handle 50 providing for adjustment as will further be described. The gas-air mixture which passes the needle valve 49 enters the tube 47 and then passes upwardly through the inner tube 51 mounted within the T-fitting 45 and is delivered from the upper end of the tube 51 into the combustion chamber at the center of the burner element. It will be noted that there is an annular space between the inner tube 51 and the threaded nipple 44 communicating both with the combustion chamber at its upper end and also with the interior of the T-fitting 45. The T-fitting 45 also receives an electrical igniter such as the spark plug 52, this device being supplied with current by a cable indicated at 53. I prefer to provide some apertures such as indicated at 54 in the inner tube 51 in the region of the spark plug 52. I have found that this needle valve and spark plug system closely connected with the inlet end of the burner results in reliable ignition and stable operation without tendency for the combustion to creep back into the T-fitting 45, which is desirable in order to avoid excessive heating of the spark plug and also of the needle control valve.

In a typical installation the electrical ignitor 52 may conveniently be left in operation throughout the use of the burner.

The gas-air mixture is supplied to the equipment shown in FIGS. 3 and 4 through the connection 55 having a manually adjustable plug valve 56 delivering the gas-air mixture into an enlarged tube 57 which in turn is connected with the pipe 48. The enlarged tube 57 serves as a part of a heat exchange device by means of which the incoming gas-air mixture is preheated before reaching the needle valve 49. This preheating is effected by utilizing heat from the products of combustion delivered from the discharge end of the heater element 42. For this purpose the discharge end of the heater element is connected with a pipe 58 having an adjustable choke valve 59 therein, the pipe 58 having a portion 58a extended through the enlarged gas supply pipe 57 so that the heat of the products of combustion is transferred to the incoming gas-air mixture. This heat exchange arrangement and also the valve 56 and supply line 55 are indicated at the left end of FIG. 2 in order to illustrate one appliance as coupled with the gas-air supply system shown in FIG. 2. From FIG. 2 it will further be seen that the discharge pipe 58a for the burner element is extended downwardly and has a downwardly inclined terminal portion 58b adapted to be extended to a point exterior of the building in which the appliance is located in order to discharge the products of combustion outside of the building. Such discharge pipes 58b are shown in FIG. 1 for various of the appliances there illustrated. The extension of the exhaust or discharge connection downwardly (either vertically or at an incline) is of importance because water comprises a component of the products of combustion and gravity will thereby discharge such water and avoid trapping or clogging of the outlet line.

In the burner arrangement of FIGS. 3 and 4 it is to be noted that the output choke valve 59 is desirably employed only for "factory adjustment" and does not constitute an everyday control in the hands of the user. Similarly, the needle valve 49 is intended for only factory or occasional adjustment, the normal manual control for the burner being provided by the adjustable plug 56 which is preferably located on the upstream side of the heat exchanger 57-58a.

Attention is now called to the fact that in the supply system illustrated in FIG. 2 the flame arrestor 32 is so located as to preclude "flame-back" either from any of the individual appliances fed by the system or from the compressor-motor unit. However even without such a flame arrestor, the arrangement of spark plug ignition and needle control valve (52 and 49) shown in FIG. 4 is also effective in preventing combustion at any point except beyond the delivery end of the inner feed tube 51 shown in FIG. 4. As will be explained hereinafter, it is contemplated to have a pressure drop across needle valve 49, and this also serves to prevent flame-back. The amount of pressure drop across the needle valve 49 may readily be controlled by adjustment of the needle valve and of the choke 59 as is explained hereinafter.

Figure 9:
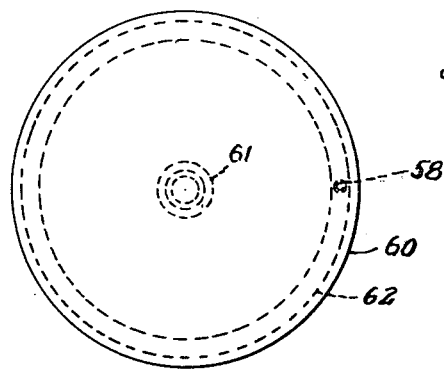
FIG. 9 is a plan view of an alternative nontubular, flat form of burner element adapted for use in a kitchen range.
Figure 10:
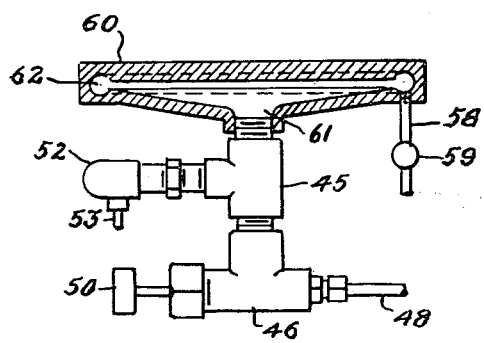
FIG. 10 is a sectional view of the burner element of FIG. 9 and showing also in outline certain of the appurtenant equipment to be used in connection with such a burner element.

An alternative form of range burner is shown in FIGS. 9 and 10. Instead of employing the spirally wound tubular burner element of FIG. 4, the embodiment of FIG. 9 employs a circular plate-like element 60, preferably formed of a metal having a low coefficient of thermal expansion and high heat resistance. The element 60 has a central boss 61 on the underside providing a combustion chamber which communicates with a thin circular cavity through which the combustion products travel radially outwardly into the peripheral groove 62 which is provided with a discharge pipe 58 as above described for discharge of the products of combustion. From FIG. 10 it will be seen that this burner is also provided with the electrical igniter 52 and needle control valve having a handle 50 and valve casing 46, as in FIG. 4.

From FIGS. 9 and 10 it will be seen that the combustion or burner element need not necessarily be in tubular form. Such burner elements may in fact be of a wide variety of shapes and sizes, depending upon the uses and purposes to be served.

Figure 14:
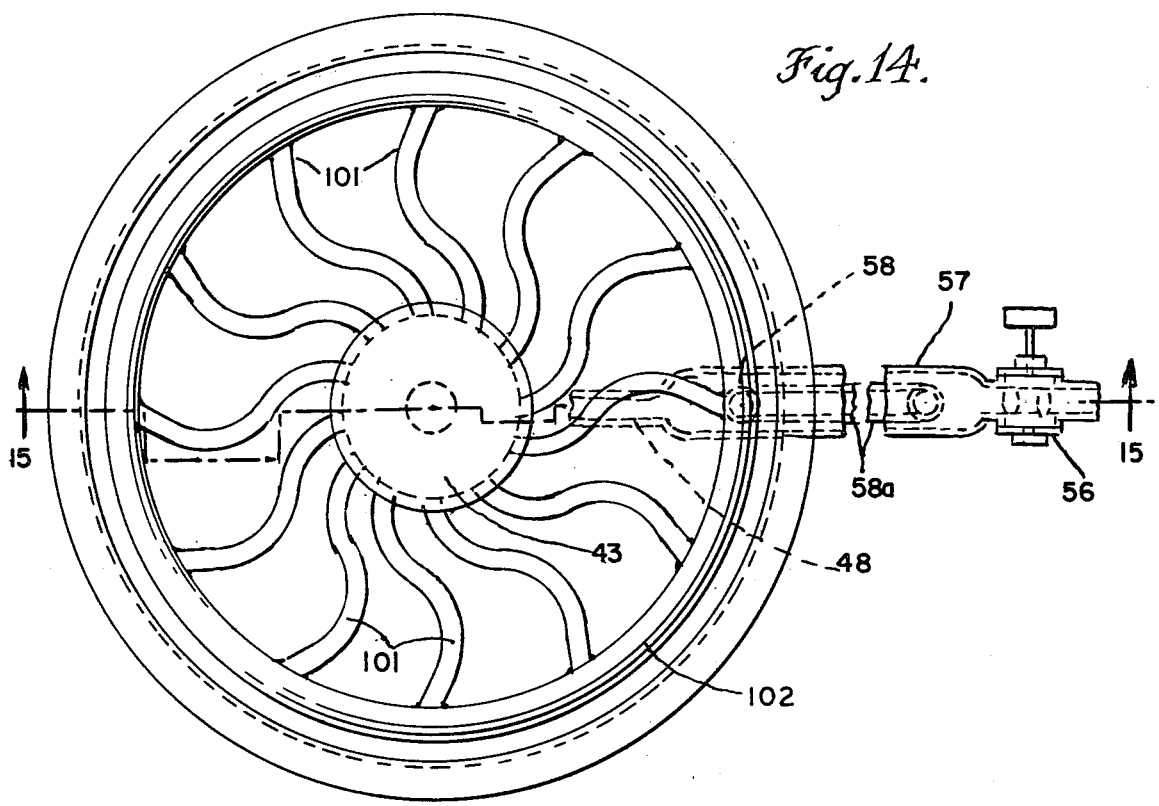
FIGS. 14 and 15 are views similar to FIGS. 3 and 4, but illustrating a modified form of heating element and associated parts adapted for use as a heater on a kitchen range.
Figure 15:
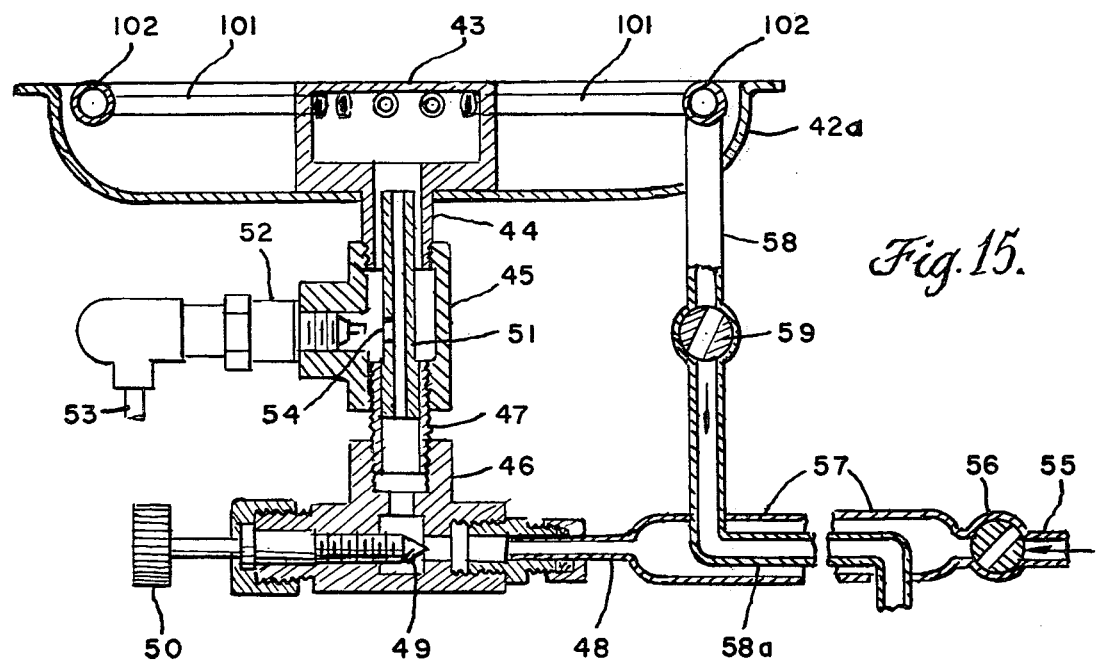

Still another form of range burners is shown in FIGS. 14 and 15. In this embodiment, instead of employing a single burner tube wound in a spiral pattern, a plurality of tubes 101 extend generally radially from the central fitting 43. The outer ends of the tubes 101 are connected with the circular exhaust duct 102 which, in turn, is connected with the offtake pipe 58.

The arrangement of FIGS. 14 and 15 is adapted for use with the same type of valving, ignition and control features described above in connection with FIGS. 3 and 4, and in the arrangement of FIGS. 14 and 15 the central fitting 43 serves as a manifold for distributing the air and fuel into the inner ends of the group of radiating burner tubes 101. Each tube 101 is desirably curved with respect to a radial line, so that expansion and contraction of the tubes is readily accommodated.

By the use of a multiplicity of burner tubes arranged in a symmetrical pattern about the center of the assembly, very high burner capacity is provided and in addition the heat is symmetrically distributed with respect to the center of the assembly.

Tubular elements in U-shape or hairpin configuration may be used for various purposes such as for air or water heating. In general, however, it is contemplated that the electrical igniter and needle valve control arrangements as described above in connection with FIG. 4 should be employed, and should be associated with the burner element as closely as practical.

The appliance illustrated in FIGS. 5, 6 and 7 comprises a space heater of a type adapted for use in shops, garages, etc. As seen in FIG. 5 this heater comprises a casing 63 in which is mounted a heater element such as the U-shaped tubular element 64 the inlet end of which is provided with a combustion chamber indicated at 65, a spark ignition 66 and a needle control valve 67, preferably of the general type described above with reference to FIG. 4. Here the gas-air supply line 68 is further provided with a manual control valve 69 which serves as the normal On-Off or adjustment valve. The heater casing is provided with a grill or grating 70 at the front, and behind the heater element 64 a fan 71 is mounted, this fan being secured to a shaft 72 (see FIGS. 6 and 7) mounted in the casing 73 of a low power turbine comprising a rotor 74 having peripheral buckets or blades 75. The gas discharge pipe 76 which is connected with the discharge port or end of the tube 64 is provided with a choke valve 77 of the kind described above in connection with FIG. 4 and this discharge pipe 76 is connected with a passage entering the casing 73 tangentially with reference to the path of movement of the blades 75 in order to serve as a jet or propelling gas stream for the rotor 74. An outlet connection 78 extends from the casing 73 to a point exterior of the building in order to discharge the products of combustion.

From the foregoing it will be seen that the space heater of FIGS. 5, 6 and 7 not only utilizes the heat of the burner tube 64 but also utilizes the combustion products discharge to actuate the fan 71 for circulation of air over the burner tube 64.

Figure 13:
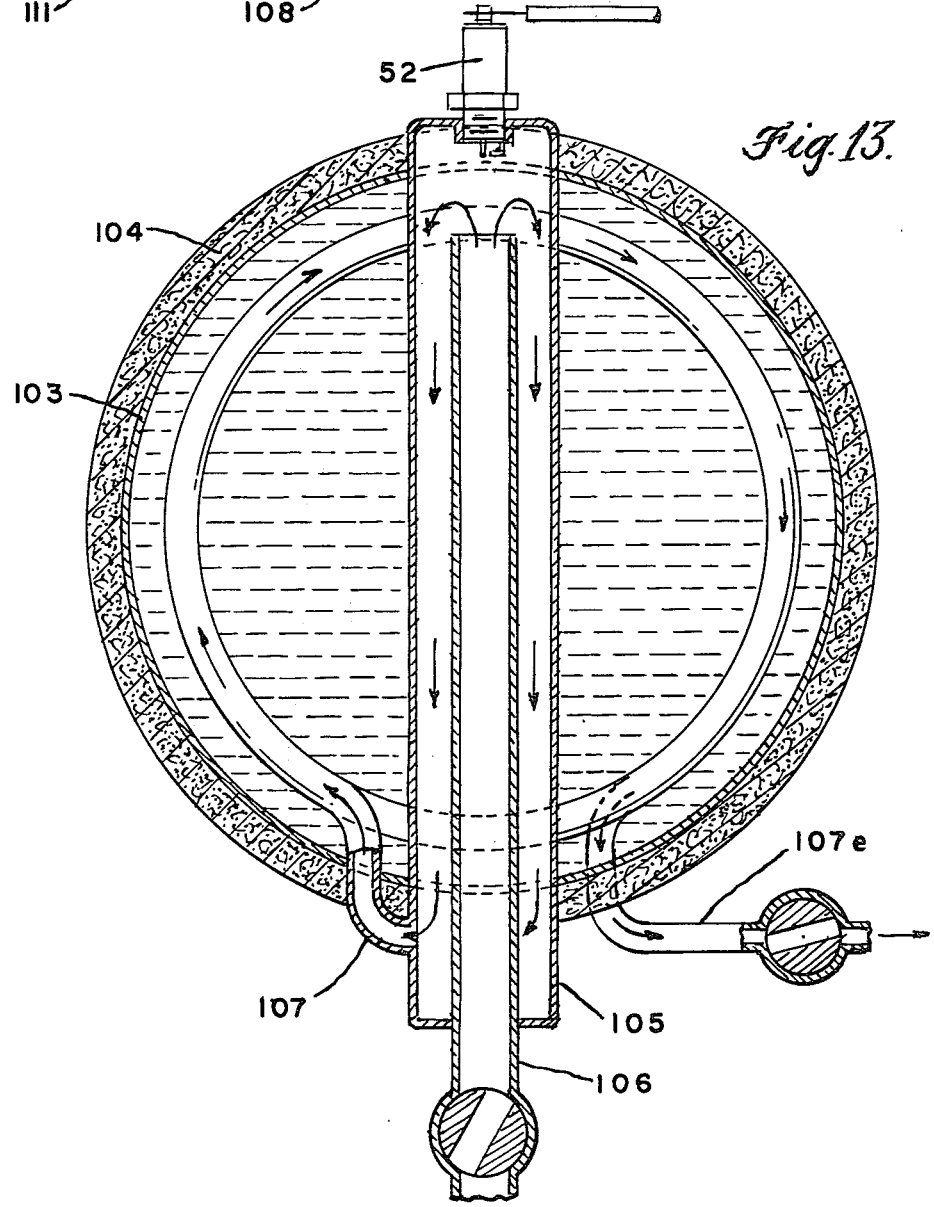
FIG. 13 is a transverse sectional view through a tank type water heater equipped with a burner constructed according to the present invention.

Still another form of burner is illustrated in FIG. 13 which represents a cross section through a cylindrical water heater tank 103 having an insulation jacket 104. The burner shown as installed in this water heater tank comprises a burner tube 105 extended through the tank, for instance diametrically thereof. A fuel and air admission tube 106 extends into one end of the burner tube 105, terminating short of the other end of the burner tube so that the two tubes intercommunicate, and in the zone of intercommunication an ignition device such as a spark plug 52 is arranged. Alternatively, the spark plug 52 may be installed in the side wall of the tube 105 near the other end thereof. An exhaust gas tube 107 is connected with the combustion tube 105 adjacent the end into which the supply tube 106 extends. This exhaust tube 107 advantageously is extended through at least several helical turns within the tank 103, the discharge end being extended externally of the tank as indicated at 107e. The helical turns of the tube 107 are advantageously spaced from each other and also from the wall of the tank 103 so as to be completely submerged in the water in the tank and thereby provide for effective heat exchange with the water. The fuel and air mixture preferably in stoichiometric proportions is introduced into the the entrance end of tube 106 which of course is provided with appropriate valving for control, and in the operation of this system the tube 106 in effect constitutes in part a fuel and air preheating device and in part a primary or preliminary combustion chamber. The tube 105 forms a secondary combustion chamber of annular configuration. The products of combustion are delivered through the tube 107 in heat exchange relation with the water in the tank.

Although the system as disclosed in FIG. 13 is adapted for use with pressurized supply and control systems of the kind described, for example in connection with FIGS. 2, 3 and 4, the system of FIG. 13 need not necessarily be employed with a needle valve such as indicated at 49 in FIG. 4. Other variations in the feed or supply system usable in connection with the arrangement shown in FIG. 13 are discussed hereinafter in connection with the consideration of variables.

Figure 11:
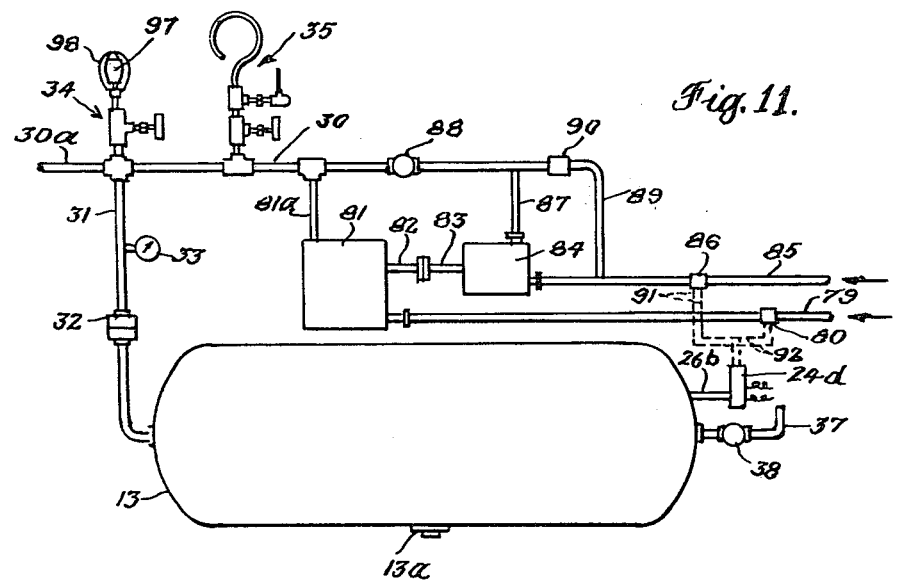
FIG. 11 is a diagrammatic view illustrating an alternative arrangement for mixing, pressurizing and storing the gas and air in stoichiometric ratio, this alternative arrangement being adapted for use, for instance in an installation such as shown in FIG. 1 in place of the equipment of FIG. 2.

FIG. 11 illustrates a modification or alternative arrangement of certain of the parts shown in FIG. 2. The equipment of FIG. 11 is particularly adapted for use in an installation where there is already available a supply of compressed air, for instance the commonly available compressed air system found in factories, laboratories and the like, usually at a pressure of from about 80–150 psi.

The system of FIG. 11 is adapted to make use of the already available source of compressed air, the supply pipe from such source being indicated in FIG. 11 at 79. The supply pipe 79 has a valve 80 therein for controlling the flow from the source of supply to the air motor indicated diagrammatically at 81. The power shaft 82 of the air motor is connected with the operating shaft 83 of the compressor or gas pump 84 which latter is provided with a gas supply connection 85 having a control valve 86 therein for turning the gas supply on and off.

The gas pump 84 has an output connection 87 connected through a needle control valve 88 with the gas-air supply line 30 described above in connection with FIG. 2. The gas pump 84 is provided with a recirculating loop 89 having a relief valve 90 therein so that the excess gas will be recirculated, thus avoiding undue build up of pressure in the output line 87.

The air motor 81 has an air discharge connection 81a connected with the gas-air supply line 30 for the gas-air mixture, so that the air which is used to operate the air motor and thus the gas pump is also utilized in the mixture.

As in the embodiment of FIG. 2 the supply line 30 is connected through a line 31 and flame arrestor 32 with the storage tank 13. Moreover, the arrangement of FIG.

11 also includes the flame test device 34 and the burner element test device 35, to be described more fully hereinafter.

The tank 13 in FIG. 11 is also desirably equipped with the automatic condensate drain valve 13a and also with a vent pipe 37 having a control valve 38 therein.

In the embodiment of FIG. 11 it is further contemplated that the valves 80 and 86 be responsive to the pressure in the storage tank 13, and for this purpose a pressure responsive switch 24d is provided with a connection 26b communicating with the interior of the storage tank 13. The electrical connections 91 and 92 serve to connect the pressure responsive switch 24d with the gas valve 86 and the air valve 80. It is contemplated that the system of FIG. 11 be adjusted so that the valves 80 and 86 will be opened at a storage tank pressure of for example 50 psi and that the valves 80 and 86 be closed upon attaining a predetermined higher pressure, for instance 60 psi. It will be understood that with a system as shown in FIG. 11, the operating air pressure, typically about 90–100 psi, will of course drop considerably as a result of actuation of the air motor, so that the air discharged through the connection 87 into the gas-air supply line 30 will be at an appropriate psi corresponding in general to the gas pressure developed by the gas pump 84. For certain installations a venturi system may be used for the purpose, instead of the air motor referred to.

The devices 34 and 35, shown in FIGS. 2, 11 and 8, are adapted for use in establishing the desired gas to air ratio in the mixture to be stored in the tank 13 and to be used in the various burners connected with the system.

Referring to FIG. 8, the device 34 comprises a nipple 93 receiving the gaseous mixture through the needle valve 94 which is adjustable by means of the handle 95. At top of nipple 93 is elongated gas mantle 97 having an opening of about ⅛" at its upper end. Such an opening may be defined by a ceramic ring to which the supporting wires 98 are connected. The device 35 comprises a tubular burner element 96 of the general type described above having an open discharge end and having a needle valve and electrical igniter associated with the input end. Thus as seen in FIG. 8, a needle valve 49a serves to deliver the gaseous mixture through the ignition T-fitting 45a having an electrical igniter 52a, these parts being arranged in the manner described above with reference to FIG. 4.

The unit 35 thus constitutes an actual typical combustion element or burner closely associated with the storage tank, pressurizing mechanism and the controls therefor, and this burner device may be employed as a double check on the gas ratio established by the use of the gas mantle ratio testing device 34.

Figure 2A:
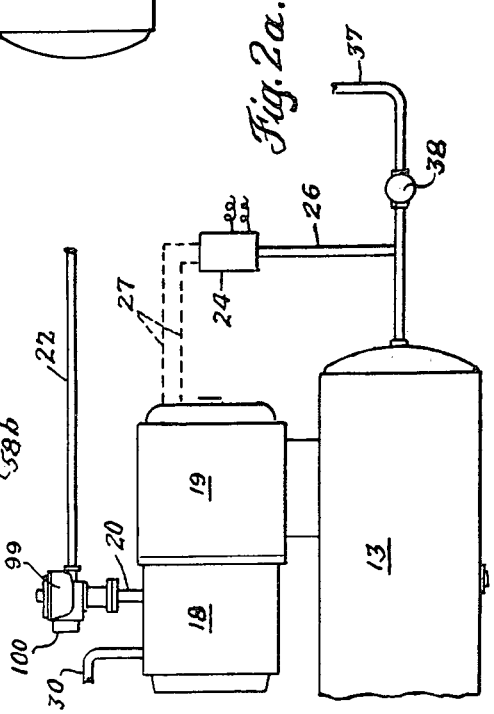
FIG. 2a is a fragmentary view of certain parts of the system of FIG. 2 illustrating the use of a carburetor for mixing the gas and air.

FIG. 2a illustrates an alternative arrangement for mixing the gas and air in a system of the general type shown in FIG. 2. In this embodiment the gas supply line 22 is extended to directly deliver gas to the carburetor 99, the carburetor also having an air inlet at 100. As is well known carburetors of this type have a venturi passage for the air, with a gas inlet port in the restriction of the venturi passage and this arrangement provides for mixture of gas and air in stoichiometric ratio, in view of which such a carburetor may be employed in place of the needle valve 29 and the air inlet 21 of FIG. 2.

In the embodiment of FIG. 2a, moreover, it is not necessary to employ a solenoid operated shut off valve such as indicated at 23 in FIG. 2, because carburetors of the type referred to are also arranged to provide for closure of the supply line when the demand terminates, and in view of this when the pressure operated valve 24 shuts off the motor 19 for the pressurizer 18 the carburetor itself will close the gas supply line. Although there are a number of well known carburetors of the kind above referred to, it may be mentioned that one suitable carburetor for this purpose is identified as "IMPCO 100 Carburetor", manufactured by IMPCO A Division Of A. J. Industries, Inc., Cerritos, Calif., U.S.A. See Baverstock U.S. Pat. Nos. 2,927,848 and 3,123,451.

Figure 12:
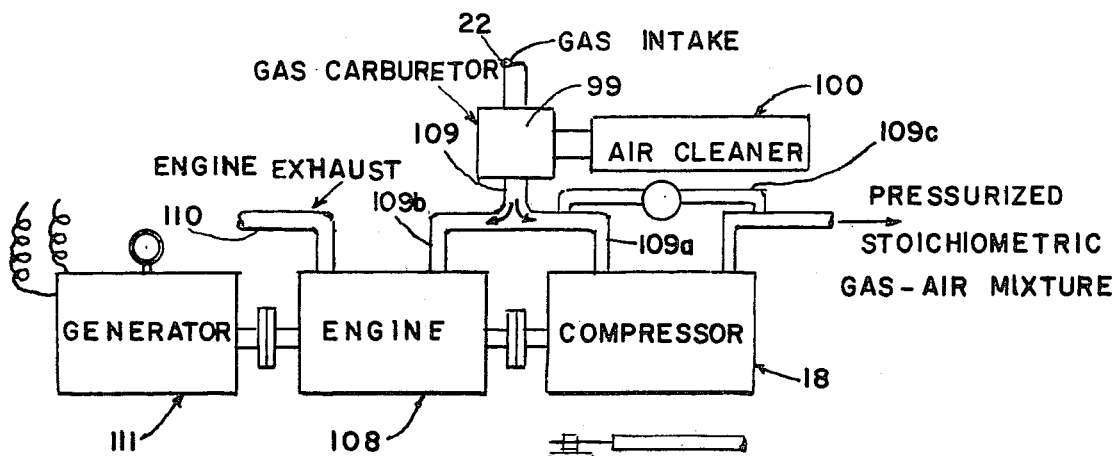
FIG. 12 is a diagrammatic view of an alternative system for mixing and pressurizing fuel and air to be used in a burner device of the kind contemplated according to the present invention.

Still another modified arrangement of the supply system is illustrated in FIG. 12. Here the stoichiometric mixture is supplied from a compressor indicated at 18 driven by an engine or a prime mover 108. A carburetor, preferably of the type referred to above in connection with FIG. 2a is diagrammatically indicated at 99 and serves to intermix air entering through the inlet and air cleaner 100 with gas entering through the line 22, in order to provide a stoichiometric mixture which, in this embodiment is delivered through the connection 109 and the branches 109a and 109b extended respectively to the compressor 18 and the engine 108, desirably an internal combustion engine. The engine exhaust is indicated at 110. To maintain an accurate gas-to-air ratio it is necessary to have a regulator in gas line upstream to the carburetor for uniform pressure.

Although such a system may deliver the compressed mixture into a storage tank as illustrated at 13 in various figures above described, this system is also adapted for use without the storage tank, in which event the engine and the associated equipment will be operated continuously, and excess pressurized gas/air mixture recirculated to the manifold of the carburetor as by the recirculation connection 109c, preferably having a pressure relief valve therein, as diagrammatically indicated.

The supply system shown in FIG. 12 is of particular advantage in that a single carburetion system is employed not only to supply the mixture to be compressed, but also to supply the fuel to the engine for driving the compressor. The employment of a common carburetor for the engine and compressor provides a simple and effective means establishing the desired stoichiometric mixture of gas and air delivered to the compressor and thus to the point of use. The reason for this is that operation of an internal combustion engine on a mixture of natural gas and air requires rather critical maintenance of a stoichiometric mixture. If the mixture varies substantially from the true stoichiometric ratio the engine will not operate, and will run smoothly only if the mixture is very close to the stoichiometric ratio. Adjustment of the carburetor to give smooth engine operation therefore constitutes a simple and effective system for establishing the desired mixture of gas and air to be fed to the compressor.

The engine may also be advantageously used for other purposes, including, for example, for the drive of an electric generator indicated at 111. Such a generator is particularly advantageous in a system incorporating the bypass 109c, in which continuous operation is contemplated.

When employing the system of FIG. 12, including the use of the gas burning internal combustion engine for drive of the compressor, it is also advantageous to effect recovering of the heat, from the engine operation. This may be done, for example, by delivering the exhaust gases through the connection 110 to a heat exchanger preferably of the kind and in the manner disclosed in my copending application Ser. No. 568,700 above identified. As there shown this expedient may be utilized to develop a supply of hot water. Moreover, when employing the system of FIG. 12 it is also contemplated to recover heat from the engine cooling jacket, for instance in the manner disclosed in application Ser. No. 568,700 above referred to.

Operation and Operational Characteristics and Variations

In a typical start up procedure, the following steps are desirably employed. These steps may be followed using any suitable gas.

First note that for purposes of start up, all of the heater elements of the appliances associated with the system will be turned off and they will only be started after the appropriate gas-air mixture is determined and built up under pressure in the storage tank 13.

With needle gas control valve 29 closed and with valve 38 and vent line 37 open, the power circuit for the pressure responsive switch 24 is closed or energized. This will result in opening of the main gas control valve 23 and also in start up of the motor 19 which drives the compressor 18 thereby drawing air into the intake 21 and commencing the pressurization of the gas-air mixture being delivered from the compressor discharge line 30 to the storage tank 13.

The needle control valve 29 for the compressor 18 is then opened, preferably wider than the ultimate setting to be established by the test and the mixture of gas and air in the intake pipe 20 for the compressor 18 will by pressurized by the compressor and delivered into the storage tank and the supply line 30. As the mixture is fed into the storage tank 13 air will of course be expelled through the vent 37.

The needle valve 94 connected to the testing mantle 97 is now slightly opened and the gas-air blend escaping from the testing mantle 97 is ignited. If the ratio of gas to air is greater than the stoichiometric ratio a flame will be visible above opening at the top of the testing mantle. If there is no flame, the needle valve 29 for the compressor 18 is gradually opened until flame appears. While carefully observing the flame this needle valve 29 is very slowly closed until flame virtually disappers while mantle glows brightly. Now, the second gas-air ratio tester 35 with electric igniter on is turned on by opening its needle valve 49a by means of handle 50a. If gas-air ratio is stoichiometrically correct or very nearly so, the test heating element 96 will readily commence to flow identically to one of the operational burners such as that illustrated in FIGS. 3 and 4. It should be emphasized that in contrast to open flame gas burners, the hermetically sealed flameless burners of the Energy Conversion System of the invention do not use excess air. In fact, it will not function unless gas-air ratio is stoichiometrically correct or very nearly so.

When the air and initial gas rich mixture has been flushed from the storage tank 13 and discharged through the vent pipe 37, the vent valve 38 is closed, and the desired pressure is now established in the storage tank. The motor 19 of the compressor 18 will be turned off by the switch 24 upon attaining the predetermined set shut off pressure, for instance 60 psi.

The pressure regulator 36 in the supply line 30a is adjusted to some appropriate value sufficiently above the maximum pressure required by any of the appliances such as 50 psi, for example, to ensure adequate flow through the line (line 12 shown in FIG. 1) when all appliances are in operation. The pressure differential between pressure regulator setting and the pressure required by the various appliances will be influenced by such factors as the distance of appliances from pressure regulator, the cross-sectional area of the various pipes and connecting in the supply system delivering the pressurized gas-air mixture to the appliances, etc.

For initiation of operation of any of the appliances referred to, for instance the range burner of FIGS. 3 and 4, it is contemplated that the electrical igniter first be turned on and that manual control valve 56 be opened so that the gas mixture will be supplied through the heat exchanger 57–58a and through the needle valve 49 to the ignition zone and combustion chamber and ultimately through the burner tube such as indicated at 42. As already mentioned, the adjustment of the needle valve 49 and of the choke 59 are not intended for normal operation but rather are intended for initial presetting, in the factory. The needle valve 49 and the choke 59 may of course be adjusted in the field by a competent serviceman.

Further with respect to the needle valves associated with the burners, such as the valve indicated at 49 in FIG. 4, it is to be understood that this device has been found to be an important component in the system. It is not provided for use for ordinary manual control or for turning a burner on and off, but it has a unique action, as compared with other forms of valves. It ensures smooth functioning of the burners, which is in contrast with the operation where other forms of valves have been tried. With other forms of valves the operation has been found to be erratic at best.

It is also important that this needle valve be arranged closely adjacent to the inlet end of a burner element, and preferably immediately adjacent to the T-fitting containing the ignition device. Both the electrical igniter and the needle valve are thus important components associated with all of the burners, regardless of the form of purpose for which they are employed.

It is also important to maintain some substantial pressure differential between the upstream and the downstream side of the needle valve, for instance the needle valve 49 of FIG. 4. This assures combustion occurring in the desired region downstream of the needle valve and especially in the combustion chamber and burner element. A pressure differential of at least 5 psi should be used, a differential of 20–40 psi being preferred. The pressure differential may be controlled not only by adjustment of the needle valve but also by the adjustment of the choke 59 in the discharge connection for the burner.

It is further to be emphasized that the system of the present invention is a pressurized system, operating at a pressure considerably higher than those ordinarily established where gas is to be burned. For instance in a typical open flame gas burner system, the supply pressure is customarily of the order of a small fraction of 1 psi. In the system of the present invention the pressure should be at least 30 psi, and most advantageously above 40 psi, for instance from 50 to 70 or 80 psi. I have operated burners of the kind disclosed at pressures ranging upwards to several hundred psi, but these very high pressures are not necessary and progressively increase the power required for compression. I have found that when employing a pressurized mixture of the gas with the quantity of air required for its combustion, the burning action within the closed burner elements will not be smooth and reliable unless pressures of the order to magnitude indicated are employed. Moreover, the pressure differential desired upstream and downstream of the burner needle valve can only be achieved by pressurizing the system in the range indicated. Finally, with regard to the pressure, it is to be understood that in the event gas from the LPG fuels is used, the pressure should not be so high as to liquify the gas.

Although as indicated in the preceeding paragraphs, the use of a needle valve (such as shown at 49 in FIG. 4), and also the use of a supply system having a pressure upwards of 30 psi provides effective, reliable and smooth burner operation in various of the burners illustrated and described. I have further found that with burners of at least some of the configurations herein disclosed for example, the burner arrangement of FIG. 13, the needle valve need not necessarily be used, provided that the pressure of the supply system is substantially lower than the preferred minimum of about 30 psi when employing the needle valve.

Thus, for example, with a burner arrangement of the kind shown in FIG. 13, and having a cross sectional flow area in the annular combustion passage within the tube 105 of at least about ½ square inch, a gate valve or other appropriate valve may be included in the supply line delivering the fuel/air mixture to the tube 106, provided the pressure of the supply system is below about 15 to 20 psi. This is a pressure which, although 10 or 15 times that of the common pressure of the gas supplied for domestic use, is only a minor fraction of the pressure desirably employed with the kind of burners (for instance monotube burners having a flow passage of less than about 0.03 square inch) herein disclosed when a needle valve is included in the system.

The reduction of the pressure from about 30 or 40 psi down to about 2 to 6 psi effects a substantial saving in power, because the power requirements for compressing the mixture to 2 to 6 psi are only a fraction of the requirements for pressurizing to 30 or 40 psi and the energy consumed for pressurizing is ordinarily not recovered. When employing the lower pressure type of system, the pressurizer utilized may advantageously be of the type known on the market as the "Roots" pressurizer, and marketed by Dresser Industries, Franklin Park, Ill., U.S.A.

With either the 30 to 40 psi range, or the 5 to 6 psi range, the system of the invention has the important advantage of substantially eliminating danger of ignition of gas leakage (for reasons noted just below) while at the same time effecting much more economical use of the heat available in the gas.

With the system of the invention it is to be noted that danger of explosion and fire hazard are minimal as compared with many gas systems, because in the event of a leak the mixture is already diluted with air, so that almost immediately upon release into the atmosphere at the point of leakage the resultant further dilution with air diminishes the gas concentration to the point where it is no longer even able to support combustion. This is a safety factor not present in systems where undiluted gas is conveyed to the site of a burner and then discharged through the burner and mixed with air only at the burner itself. Gas leakage in such systems presents a serious fire hazard because at the point of leakage the gas is readily ignitible, as is well known.

A typical example of a natural gas adapted to be used is known to have a composition as follows:

| Component | Mol Percent |
| --- | --- |
| Methane | 93.66 |
| Propane | 0.89 |
| N—Butane | 0.20 |
| Iso-Butane | 0.23 |
| Ethane | 4.38 |
| N—Pentane | 0.06 |
| Iso-Pentane | 0.09 |
| Hexanes & Heavier | 0.16 |
| Carbon Dioxide | 0.33 |
| | 100.00 |

With such a gas the ratio of gas to air should closely approximate 1 to 9.52. With a typical propane gas the ratio of gas to air is 1 to 23.8 and with butane it is 1 to 30.9. While methane has 1011 Btu/per cubic foot, propane 2522 Btu/per cubic foot and butane 3270 Btu/per cubic foot, it will be noted that the Btu contained in each cubic foot of gas-air blend discharged from the compressor does not vary significantly, regardless of which gas is used. It is always approximately 100 Btu/per cubic foot. In other words if the compressor has a free air intake capacity of 30 cfm, its Btu output per minute is approximately 3000 or 180,000 Btu per hour. This is sufficient heat to not only meet the heating requirements of a large home in 11° F. weather, but also to meet all requirements of its major appliances such as kitchen range, oven, water heater, clothes dryer, etc.

The use of the heat exchanger for transferring heat from the products of combustion to the incoming gas-air mixture, as with the heat exchanger 57–58a shown in FIG. 4, not only recovers heat from the products of combustion but in addition has a further advantage in an installation of the kind diagrammed in FIG. 1 where various appliances in a house are provided with burners according to the system of the invention and will require extension of the gas discharge line through floor and/or walls. In such situations, the positioning of the gas carrying tube of the heat exchanger inside of the conduit or pipe carrying the gas-air mixture results in insulation of the hot inner tube from floors or walls through which the pipe may have to extend.

It is also of great importance that by mixing and burning the gas in a closed burner element and with precisely that quantity of air needed to oxidize the hydrocarbon content of the gas used, the products of combustion are clear, odorless and non-toxic, consisting solely of nitrogen, carbon dioxide, water vapor, and the rare gases of air. Such products thus cannot be considered as pollutants.

Although the drawings illustrate burner elements for kitchen ranges and for purposes of air heating, it will be understood that the burner elements may be employed for a wide variety of other purposes, such as, for duct type air heaters, oven heaters, immersion heaters, immersion heaters for heating water and other fluids, melting pots, circulation heaters, for liquids and viscous material, fluid heat transfer, hot water boilers, steam boilers, hot plates, radiant heaters, comfort heaters, etc. The burner elements also make possible "easy to clean" flat surface range burners and a wide variety of self heating cooking utensils which are entirely beyond the scope of the conventional open flame gas burners.

In connection with power, although the drawings illustrate the use of turbines which operate from the combustion gases discharged from burner elements, it should be mentioned that the pressurized stoichiometric gas-air blend may also be readily used for operating more sophisticated types of gas turbines than those shown, captive and free piston power devices similar to those now being actuated by compressed air and as a brilliant light source if combusted in a correctly designed appliance. An example is a suitably designed mat of boron nitride fibers encased in a suitably designed quartz globe. These fibers may be made to achieve temperatures and light intensities approaching those of tungsten filaments when the combustion within fibers taken place at elevated pressures as herein contemplates.

I claim:

1. Equipment for use in heating solid, liquid or gaseous materials, comprising an enclosed burner element having a combustion chamber with inlet and discharge ports, a carburetor for supplying a mixture of gaseous fuel and air, means for pressurizing said mixture including a pressurizer, a gas burning prime mover for driving the pressurizer, a manifold for connecting said carburetor to both said prime mover and said pressurizer, a supply line for delivering the pressurized mixture from the pressurizer to the inlet port of the burner element, and an adjustable valve in the supply line, and further including a by-pass extended from said supply line to said manifold.

* * * * *